US 8,454,366 B2

(12) United States Patent
Orban et al.

(10) Patent No.: US 8,454,366 B2
(45) Date of Patent: Jun. 4, 2013

(54) ACTUATED SUPPORT PLATFORM FOR VIDEO SYSTEM

(75) Inventors: Gauthier Orban, Boucherville (CA); Michel Bérubé, Contrecoeur (CA); Philippe Roy, St-Bruno (CA)

(73) Assignee: D-Box Technologies Inc., Longueuil (CA)

(*) Notice: Subject to any disclaimer, the term of this patent is extended or adjusted under 35 U.S.C. 154(b) by 1753 days.

(21) Appl. No.: 11/289,352

(22) Filed: Nov. 30, 2005

(65) Prior Publication Data

US 2007/0122793 A1     May 31, 2007

(51) Int. Cl.
    *G09B 9/02*     (2006.01)

(52) U.S. Cl.
USPC ....... 434/29; 248/163.1; 248/163.2; 248/370; 434/30; 434/55; 434/56; 434/57; 434/58; 434/61; 434/62; 434/63; 434/64; 472/95; 472/96; 472/97; 472/99; 472/101; 472/102; 472/130; 472/131; 472/132; 472/135; 472/136

(58) Field of Classification Search
USPC .......... 434/29–30, 55–58, 61–64; 472/95–97, 472/99, 101–102, 130–132, 135–136; 248/163.1, 163.2, 370
See application file for complete search history.

(56) References Cited

U.S. PATENT DOCUMENTS

| | | | |
|---|---|---|---|
| 3,577,659 A | | 5/1971 | Kail |
| 3,736,602 A * | | 6/1973 | Miller ............................ 5/176.1 |
| 4,038,710 A * | | 8/1977 | Tambascio .................... 5/200.1 |
| 4,113,223 A * | | 9/1978 | Kakizaki ....................... 248/430 |
| 4,263,683 A | | 4/1981 | Knoke |
| 4,584,896 A | | 4/1986 | Letovsky |
| 4,710,128 A * | | 12/1987 | Wachsmuth et al. ............ 434/46 |
| 5,109,952 A * | | 5/1992 | Starks et al. ................ 182/69.5 |
| 5,168,514 A * | | 12/1992 | Horton et al. ................ 378/209 |
| 5,199,875 A * | | 4/1993 | Trumbull ........................ 434/62 |
| 5,226,816 A * | | 7/1993 | Hawkins ........................ 434/38 |
| 5,384,704 A * | | 1/1995 | Snyder et al. ...................... 701/1 |
| 5,419,613 A * | | 5/1995 | Wedeking ................. 297/217.1 |
| 5,433,670 A * | | 7/1995 | Trumbull ........................ 472/60 |

(Continued)

FOREIGN PATENT DOCUMENTS

JP      11-235471      8/1999

OTHER PUBLICATIONS

Battlechair™, Mikedewolfe, Review, http://www.game-boyz.com/content/node/506, Oct. 9, 2009, 3 pages.

(Continued)

*Primary Examiner* — Jack Yip
(74) *Attorney, Agent, or Firm* — Norton Rose Canada LLP (57) ABSTRACT

An actuated support frame for transmitting motion to a seat with respect to a ground as a function of motion signals associated with video output, comprises a frame. The frame is expandable/retractable along translational degrees of freedom. Support surfaces are provided on the frame. The support surfaces are displaceable with respect to one another by expansion/retraction of the frame so as to be sized to support a seat. Actuators are provided between the frame and the ground. The actuators receive signals and selectively displace the frame with respect to the ground in synchronization with a video output, whereby a seat supported on the frame is displaceable within the frame. A method for installing a seating system of a motion simulator system is also provided.

10 Claims, 7 Drawing Sheets

U.S. PATENT DOCUMENTS

| | | | |
|---|---|---|---|
| 5,496,220 A * | 3/1996 | Engstrand | 472/60 |
| 5,499,920 A * | 3/1996 | Trumbull | 434/69 |
| 5,509,631 A | 4/1996 | De Salvo | |
| 5,511,979 A | 4/1996 | Perfect et al. | |
| 5,527,184 A * | 6/1996 | Trumbull | 434/69 |
| 5,567,157 A * | 10/1996 | Salmon, Jr. et al. | 434/29 |
| 5,584,697 A * | 12/1996 | Trumbull | 434/58 |
| 5,605,462 A * | 2/1997 | Denne | 434/55 |
| 5,722,897 A * | 3/1998 | Engstrand | 472/60 |
| 5,806,113 A * | 9/1998 | McMahan et al. | 5/109 |
| 5,853,330 A | 12/1998 | Engstrand | |
| 5,954,508 A | 9/1999 | Lo et al. | |
| 5,970,537 A * | 10/1999 | Hanes et al. | 5/13 |
| 5,996,145 A * | 12/1999 | Taylor | 5/200.1 |
| 6,027,342 A * | 2/2000 | Brown | 434/55 |
| 6,039,653 A | 3/2000 | Engstrand | |
| 6,077,078 A | 6/2000 | Alet et al. | |
| 6,083,106 A * | 7/2000 | McDowell | 463/46 |
| 6,089,663 A * | 7/2000 | Hill | 297/258.1 |
| 6,092,873 A * | 7/2000 | Downey et al. | 297/344.1 |
| 6,094,180 A * | 7/2000 | Mead, Jr. et al. | 345/8 |
| 6,106,298 A * | 8/2000 | Pollak | 434/29 |
| 6,139,324 A | 10/2000 | Roy et al. | |
| 6,224,380 B1 | 5/2001 | Lo et al. | |
| 6,283,757 B1 * | 9/2001 | Meghnot et al. | 434/33 |
| 6,371,766 B1 * | 4/2002 | Doll et al. | 434/373 |
| 6,396,462 B1 | 5/2002 | Mead, Jr. et al. | |
| 6,445,960 B1 | 9/2002 | Borta | |
| 6,585,515 B1 * | 7/2003 | Roy et al. | 434/55 |
| 6,659,773 B2 * | 12/2003 | Roy et al. | 434/55 |
| 6,662,560 B2 * | 12/2003 | Roy et al. | 60/545 |
| 6,774,870 B2 * | 8/2004 | Mead et al. | 345/8 |
| 6,923,773 B2 * | 8/2005 | Leivseth et al. | 601/27 |
| 7,155,762 B2 * | 1/2007 | Harrow | 5/288 |
| 7,195,486 B2 * | 3/2007 | McGraw | 434/29 |
| 7,402,041 B2 * | 7/2008 | Nelms et al. | 434/55 |
| 2001/0017482 A1 * | 8/2001 | Roy et al. | 297/314 |
| 2001/0036868 A1 * | 11/2001 | Roy et al. | 472/130 |
| 2002/0113469 A1 * | 8/2002 | Stern et al. | 297/256.16 |
| 2002/0164560 A1 * | 11/2002 | Borta | 434/55 |
| 2003/0180693 A1 | 9/2003 | Mulder et al. | |
| 2004/0029094 A1 * | 2/2004 | McGraw | 434/365 |
| 2004/0068211 A1 * | 4/2004 | Leivseth et al. | 601/49 |
| 2004/0229192 A1 | 11/2004 | Roy et al. | |
| 2005/0069839 A1 * | 3/2005 | Denne | 434/29 |
| 2005/0142520 A1 | 6/2005 | Kim | |
| 2006/0200054 A1 * | 9/2006 | Talish et al. | 601/98 |
| 2006/0200287 A1 * | 9/2006 | Parison et al. | 701/37 |
| 2006/0256234 A1 * | 11/2006 | Roy et al. | 348/407.1 |
| 2006/0256972 A1 * | 11/2006 | Roy et al. | 381/23 |
| 2007/0059668 A1 * | 3/2007 | Mallaci et al. | 434/29 |
| 2007/0129596 A1 * | 6/2007 | Dickie | 600/26 |
| 2008/0109265 A1 * | 5/2008 | Roy et al. | 705/5 |

OTHER PUBLICATIONS

International Search Report, PCT/CA2006/001902, Feb. 7, 2007, 4 pages.

* cited by examiner

ACTUATED SUPPORT PLATFORM FOR VIDEO SYSTEM

BACKGROUND OF THE INVENTION

1. Field of the Invention

The present invention generally relates to motion simulators and, more particularly, to a structural configuration of a motion simulator system receiving motion signals as a function of actions taking place in a video output.

2. Background Art

Home video games and home video systems have for years been limited to sight and sound interaction with a viewer. For instance, in response to the play of a gamer, video games will produce visual and sound response. In order to increase the sensation procured by video games, gamers often have recourse to arcades, wherein some video games are equipped with force feedback interfaces, by which a feel is added to the visual and sound response.

Due to the popularity of home video games and home video systems, force feedback interfaces have been developed and are readily available to provide the feel to viewers. For instance, BattleChair™ is a chair provided with a variety of speakers by which the sound output of a video output is transmitted to the chair and its occupant. More specifically, the BattleChair™ is hollow and has a subwoofer and three-way speakers that will cause the chair to vibrate as a function of the sound transmitted from the video output. Accordingly, the BattleChair™ provides a feel of the game to the gamer during play. In arcades, some force feedback interfaces include gamer-receiving receptacles, wherein the gamer is seated. In order to fully procure the feel of the game to the gamer, gamer-receiving receptacles often provide support to the gamer's limbs, whereby the gamer is in a position of weightlessness.

Similar technologies have been brought to homes, but these types of force feedback interfaces are bulky and heavy. Owners of these types of interfaces must dedicate a fair amount of floor space—often a room—to have such interfaces at home. Such interfaces are not easily displaced and are hence impractical.

A motion simulator is described in US patent Application Publication No. US 2004/0229192, by Roy et al., as published on Nov. 18, 2004. The motion simulator has a seating portion supported on a floor by actuators. In an embodiment thereof, the actuators are an integral part of the seating portion, whereby a consumer purchases the motion simulator as an integral system of a seating portion with actuators.

However, the consumer may desire motion simulators that will not be restricted to specific designs, so as to match his/her existing home decoration/style. It is contemplated to provide force feedback interfaces, such as motion simulators, that are less invasive in view of domestic use.

SUMMARY OF INVENTION

It is therefore an aim of the present invention to provide an actuated support platform for a motion simulator, which addresses issues associated with the prior art.

It is a further aim of the present invention a method of installing a seating system of a motion simulation system.

Therefore, in accordance with the present invention, there is provided an actuated support frame for transmitting motion to a seat with respect to a ground as a function of motion signals associated with video output, comprising: a frame, the frame being expandable/retractable along at least one translational degree of freedom; support surfaces on the frame, the support surfaces being displaceable with respect to one another by expansion/retraction of the frame so as to be sized to support a seat; and at least one actuator between the frame and the ground, the actuator being adapted to receive signals, to selectively displace the frame with respect to the ground in synchronization with a video output; whereby a seat supported on the frame is displaceable within the frame.

Further in accordance with the present invention, there is provided a method for installing a seating system of a motion simulator system, comprising the steps of: providing an actuated support frame having an expandable/retractable frame with actuators; positioning the actuated support frame on the ground such that the actuators can displace the frame with respect to the ground; adjusting a size of the frame as a function of width and length dimensions of a seat to be supported by the frame; positioning the seat on the frame; and connecting the actuators to a signal source in synchronization with a selected video output; whereby actuation of the actuators displaces the seat with respect to the ground in synchronization with the selected video output.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
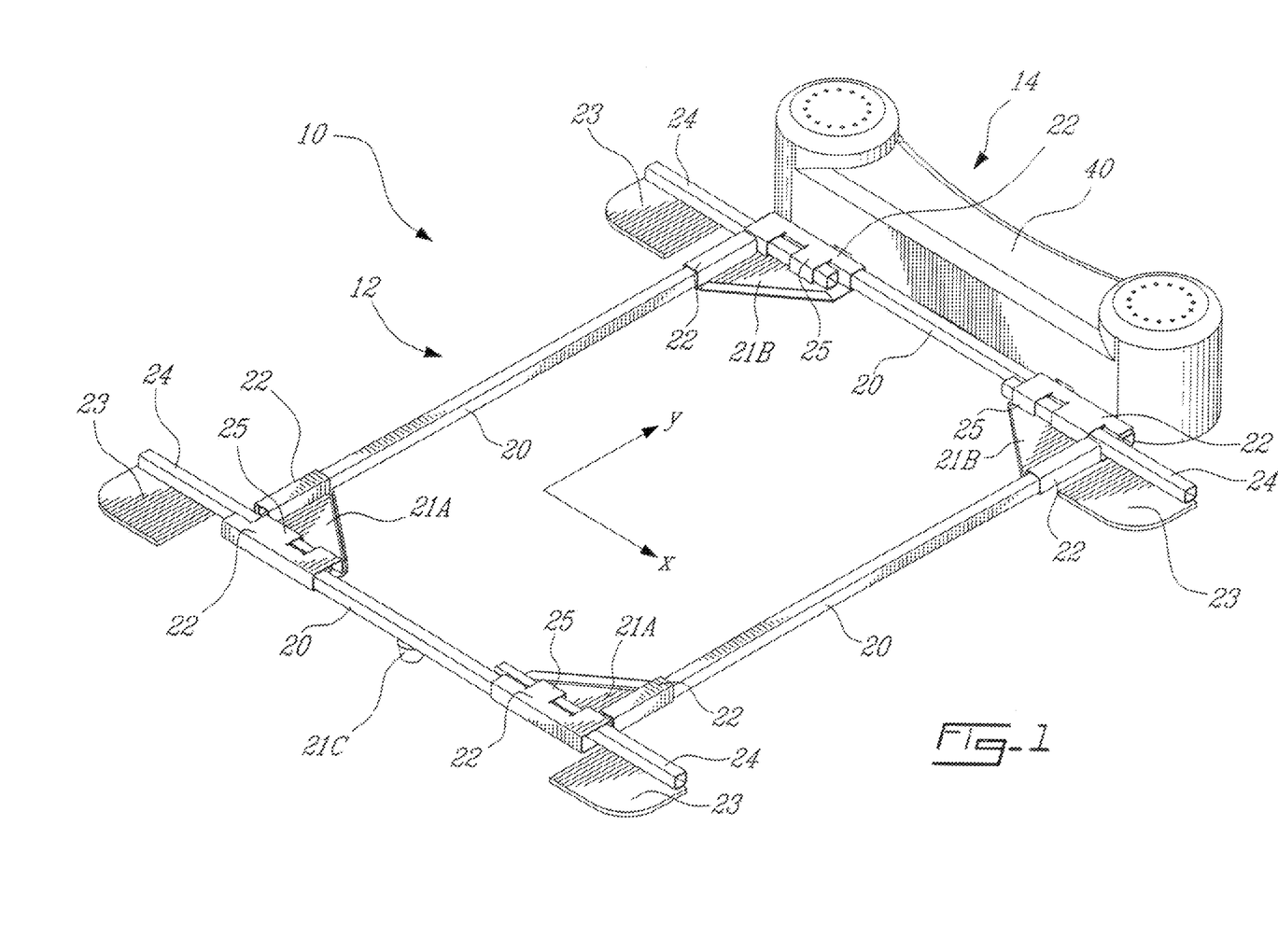
FIG. 1 is a front perspective view of an actuated support platform for a motion simulator, in accordance with a first preferred embodiment of the present invention.

Referring now to the drawings, and more particularly to FIG. 1, an actuated support platform in accordance with a preferred embodiment of the present invention is generally shown at 10. The support platform 10 has a frame 12 and actuator module 14.

Figure 6:
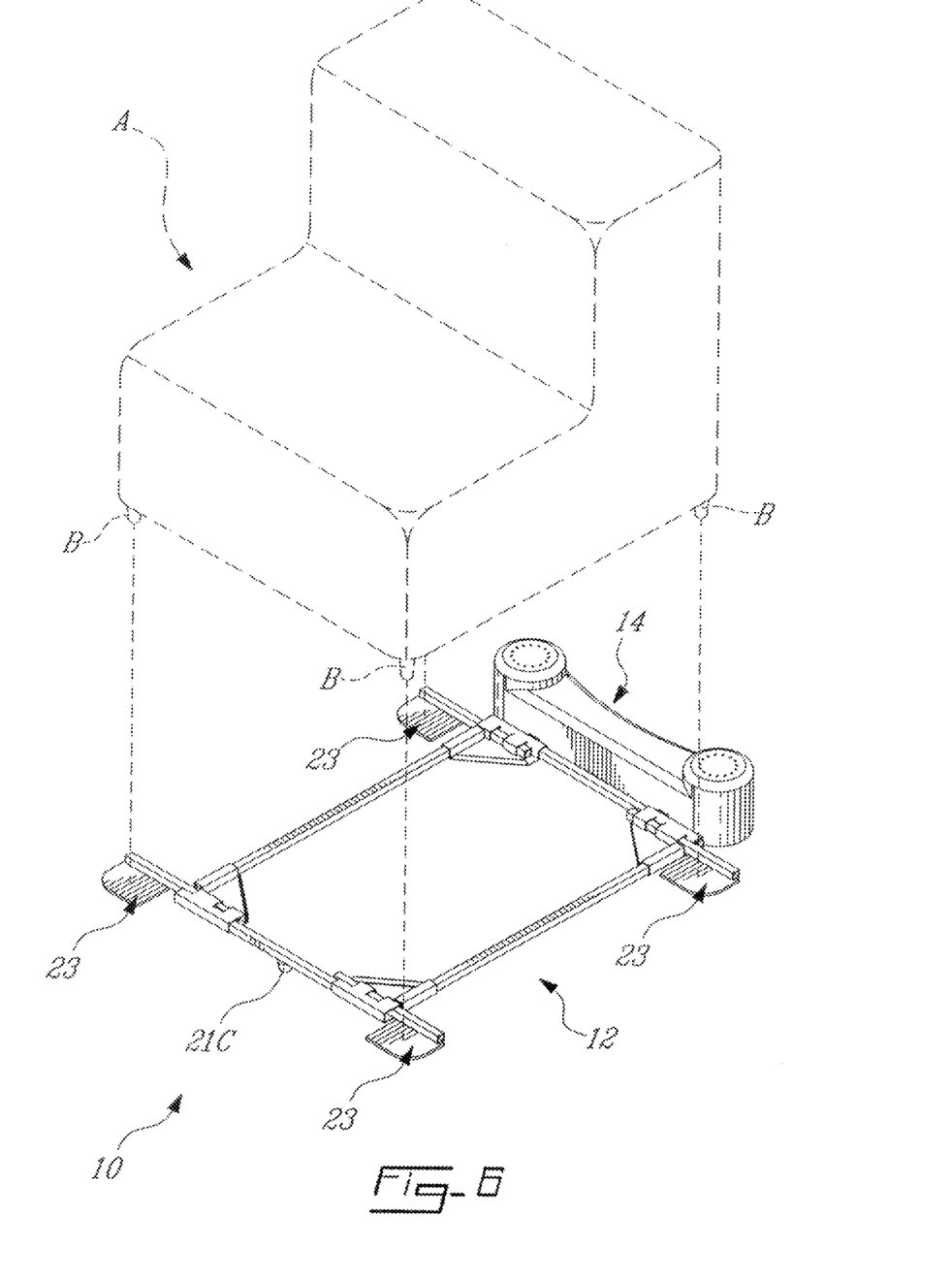
FIG. 6 is an assembly view of the actuated support platform of FIG. 1, with a seat.

The frame 12 is provided to support a seat A, as illustrated in FIG. 6. The frame 12 is the interface between the seat and the actuator module 14 and the ground.

The actuator module 14 is connected to a video system, game console or the like, so as to receive actuation signals or similar protocol to displace the seat A (FIG. 6) as a function of the video output of a monitor (e.g., screen, television) associated with the video output of the video system, game console or the like. Video output relates throughout to audio and/or video output produced by a video system, such as a game console, video disk player, VHS, HD television or the like.

Referring to FIG. 1, the frame 12 has a generally rectangular shape having four tubular members 20. The tubular members 20 are interrelated to one another by the end connectors 21. The end connectors 21 include the end connectors 21A at a proximal end of the frame 12, and the end connectors 21B at a distal end of the frame 12.

A support or leg 21C is typically provided on the tubular member 20 between the end connectors 21A, so as to support the platform 10 at a front end on the ground. The end connectors 21B are both rigidly connected to the actuator module 14, so as to relate the frame 12 to the actuator module 14 for transmission of movement therebetween.

The end connector members 21 each have a pair of frame housings 22 in which the tubular members 20 are received. Accordingly, because of the telescopic relation between the tubular members 20 and the frame housings 22, the frame has two translational degrees-of-freedom, and is thus expandable/retractable along the X axis and the Y axis.

Support plates 23 are provided at the four corners of the frame 12. The support plates 23 are related to the frame 12 by tubular members 24 received in support housings 25 of the end connectors 21. Accordingly, the telescopic relation between the tubular members 24 and the support housings 25 enables translation of the support plates 23 along the X axis.

Therefore, because of the X- and Y-axis translational degrees of freedom, the frame 12 is sizeable as a function of the seat that will be used with the actuated support platform 10. As shown in FIG. 6, the seat A has four legs B (three of which are visible), each one of the legs B being positioned on top of the one of the support plates 23. Once the frame 12 has been adjusted in dimensions to support the seat A, the tubular members 20/24 are preferably secured to the end connectors 21 (e.g., using some bolts or other suitable fasteners).

The seat A being positioned on the frame 12 is thus subjected to the action of the actuation module 14. Accordingly, an occupant (or occupants) of the seat A will be subjected to the movements caused by the actuation module 14.

It is pointed out that a support plane (i.e., support surface) of the support plates 23 is lower than the upper surfaces of the tubular members 20/frame housings 22. Accordingly, the seat A is close to the ground in this configuration, whereby the support platform 10 is generally discreet.

It is however contemplated to position the support plane of the support plates 23 above the upper surfaces of the tubular members 20/frame housings 22. In such a way, seats without four protruding legs, such as the legs B, can be supported by the support platform 10.

Although not shown, various configurations can be provided on the support plates 23 to ensure that the seat A remains secured to the frame 12. For instance, concavities can be provided in the support plates 23 to coact with gravity to maintain the seat A in position with respect to the frame 12.

Figure 2:
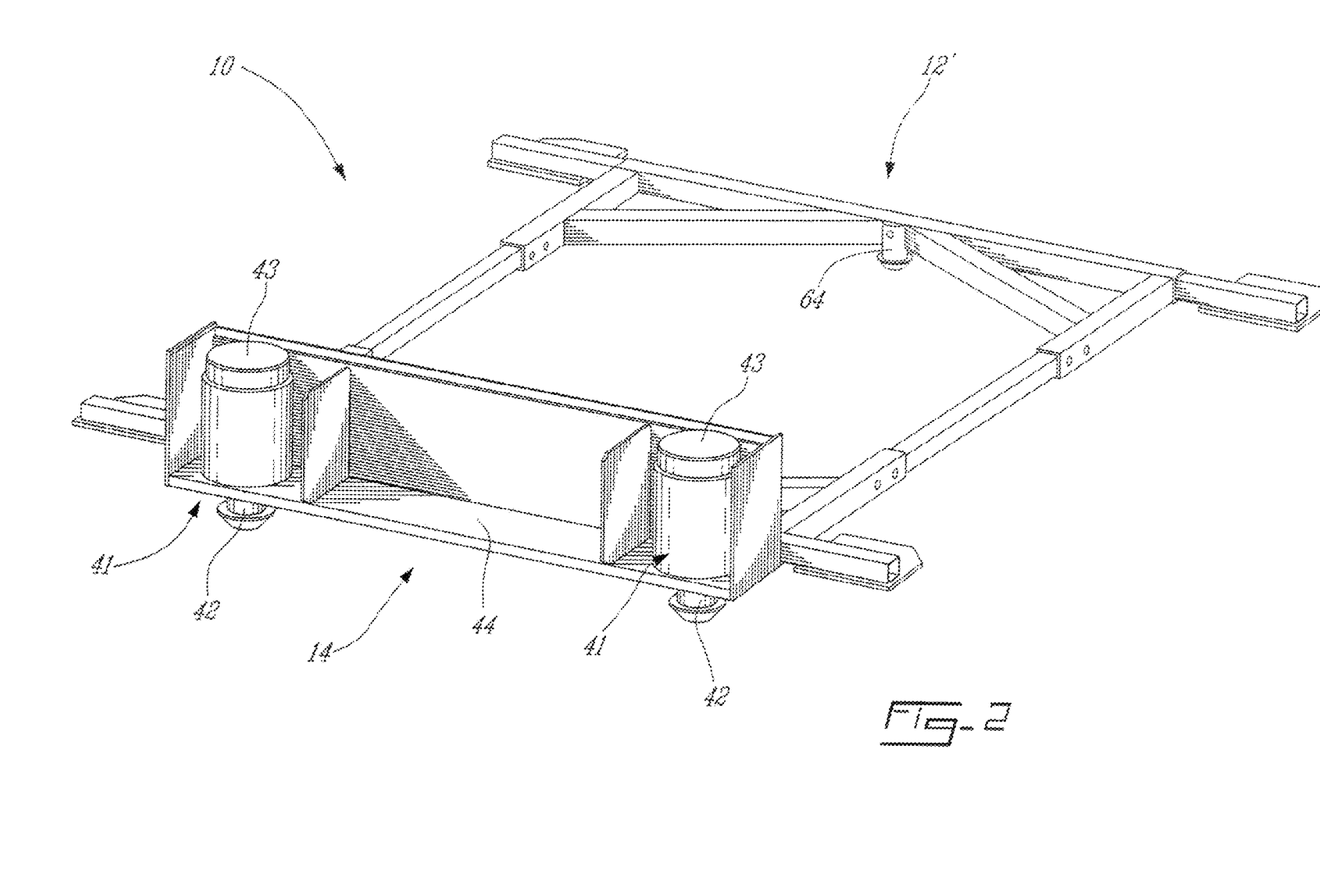
FIG. 2 is a rear perspective view of the actuated support platform of FIG. 1, illustrating a relation between an actuation module and a frame.

Referring to FIG. 1, the actuation module 14 is provided with a cover 40 that will accommodate the various components of the actuation module 14. Referring to FIG. 2, the cover 40 is removed to expose a pair of actuators 41. The actuators 41 are inverted, in that the output shafts 42 face toward the ground whereas the casings 43 of the actuators 41 are secured to a casing 44 of the actuation module 14.

Accordingly, the output shafts 42 support the support platform 10 at the distal end of the frame 12. Actuation of the actuators 41, whether individually or in combination, will result in movement of the frame 12, and thus of the seat A supported by the frame 12.

Although a pair of actuators 41 are illustrated in FIG. 2, it is pointed out that one or more actuators could be provided with platform 10. The platform 10 with a pair of actuators 41 moves in two degrees of freedom (e.g., pitch and roll), whereas a platform 10 with a single actuator 41 would be displaceable along a single degree of freedom (e.g., pitch). As will be described hereinafter, more actuators can be used to provide an additional degree of freedom.

Figure 3:
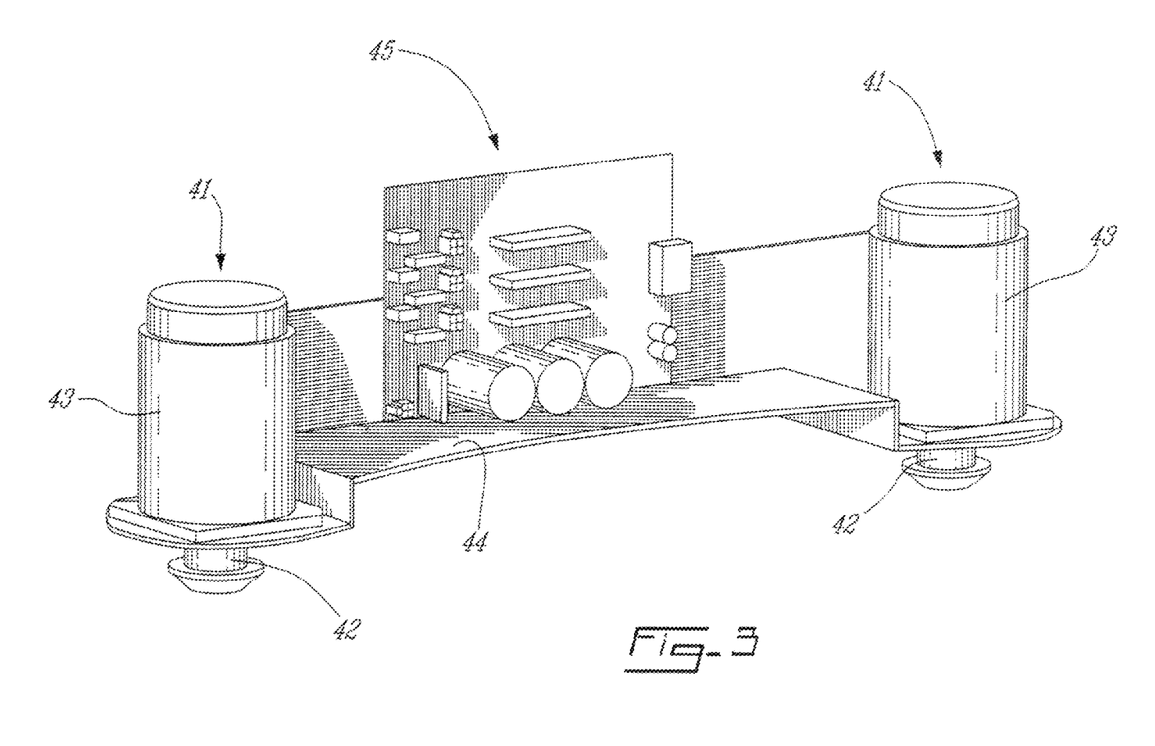
FIG. 3 is a perspective view of the actuation module of the actuated support platform of FIG. 1, without any cover.

As shown in FIG. 3, the casing 44 may support electronic components 45, which interconnect the actuators 41 to the motion simulator command system (e.g., as a function of the video output). The electronic components 45 provide power to the actuators 41.

It is pointed out that the frame 12' illustrated in FIG. 2 is slightly different than the frame 12 of FIG. 1. However, the frame 12' is also expandable/retractable along the X and Y axes, and thus along two translational degrees of freedom. Accordingly, the frame 12' may also be adjusted to the dimensions of a seat.

Figure 5:
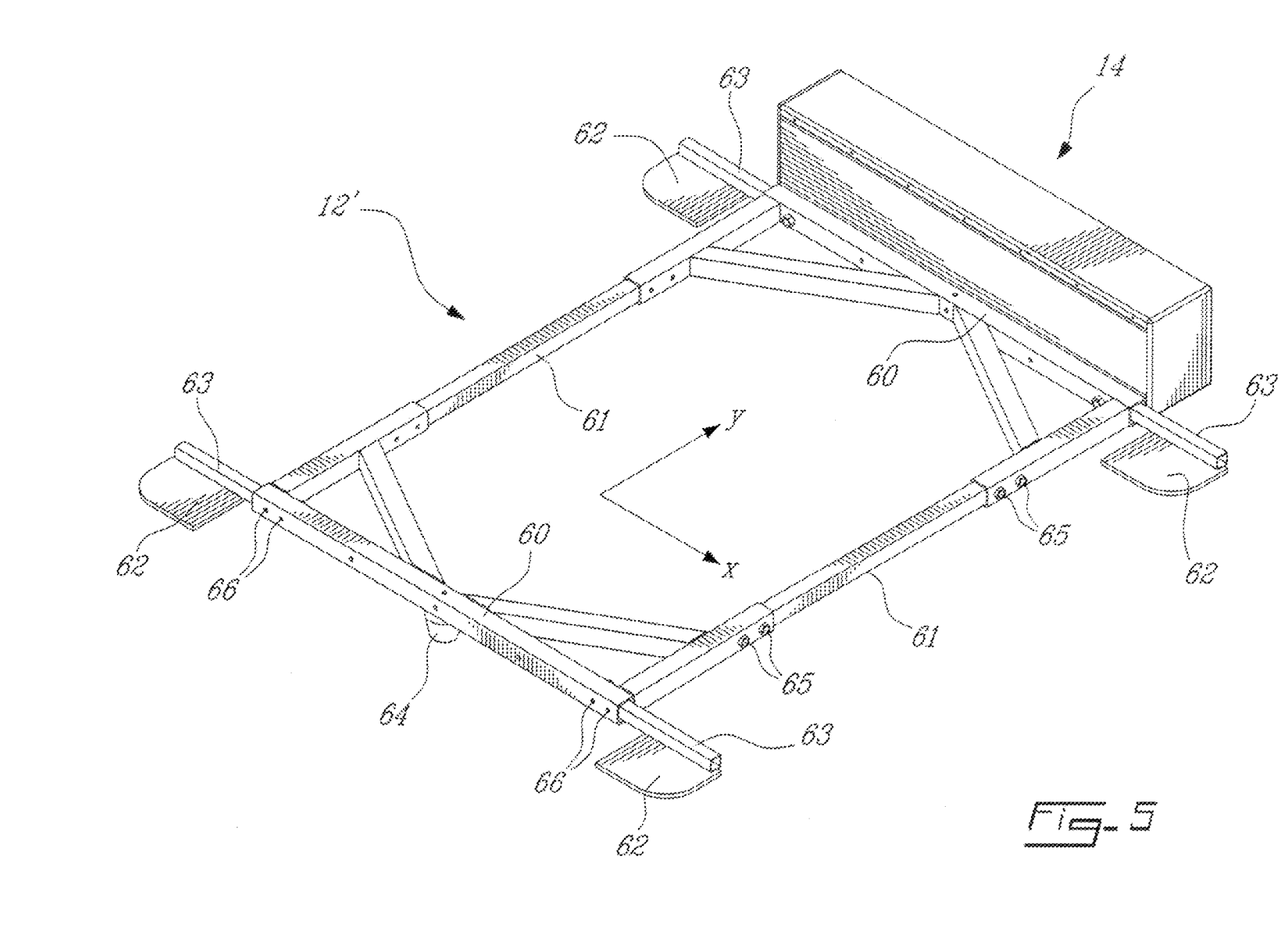
FIG. 5 is a front perspective view of the actuated support platform of FIG. 1, with an alternative frame.

The frame 12' of FIGS. 2 and 5 has a pair of end sub-frames 60 interconnected by a pair of tubular members 61. The tubular members 61 are telescopically mounted to the sub-frames 60 such that the frame 12' is expandable/retractable along the Y axis.

Similarly, support plates 62 are positioned at the four corners of the frame 12'. The support plates 62 are equipped with tubular members 63 so as to be telescopically related to the sub-frames 60. Accordingly, the support plates 62 are displaceable along the X axis to adjust the frame 12' to the width of a seat (such as the seat A of FIG. 6).

A leg 64 is shown in FIG. 5 as secured to a proximal sub-frame 60. The actuation module 14 is fixed to the distal sub-frame 60. Therefore, the frame 12' is supported on the ground by the leg 64 and the pair of output shafts (FIG. 2). Fasteners 65 are provided in the sub-frames 60, so as to releasably lock the tubular members 61 to the sub-frames 60 for a suitable dimension of the frame 12'. Similar fasteners 66 are provided to releasably lock the support plates 62 to the sub-frames 60.

Figure 4:
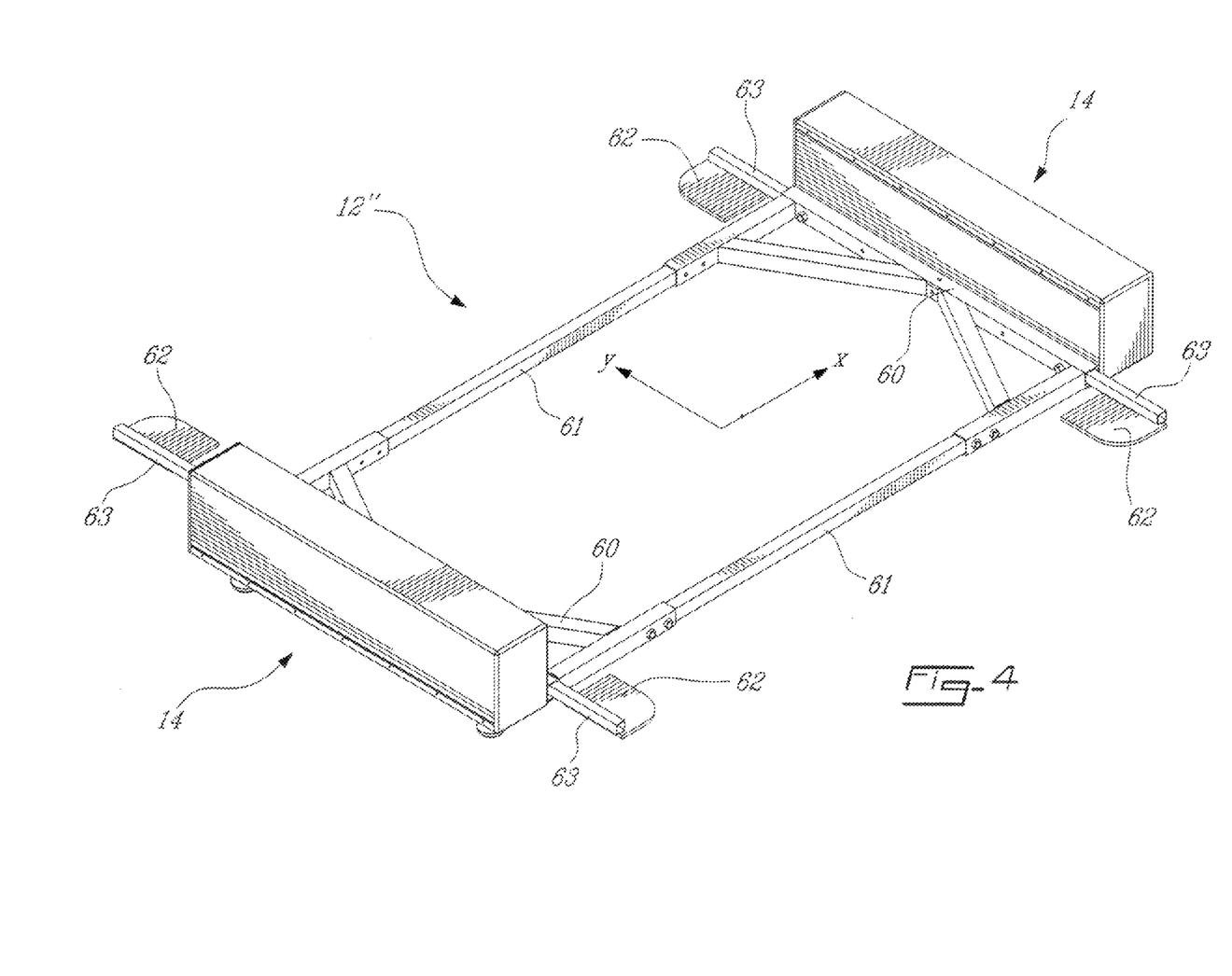
FIG. 4 is a perspective view of an actuated support platform having a pair of actuation modules, in accordance with a second preferred embodiment of the present invention.
Figure 7:
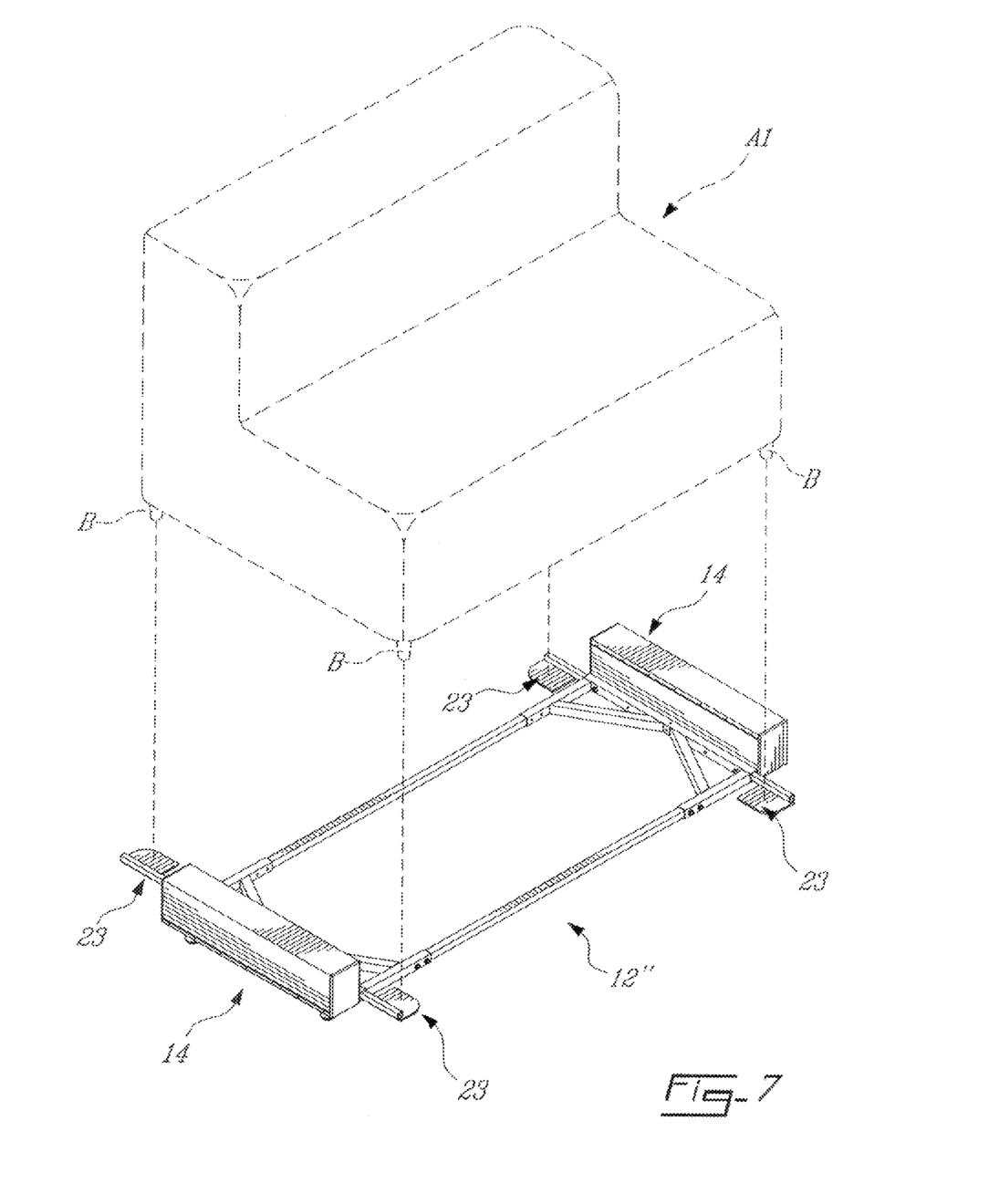
FIG. 7 is an assembly view of the actuated support platform of FIG. 4, with a seat.

The frames 12 and 12' are typically used to support relative small seats, such as one- and two-seaters, with the actuation module 14 being positioned at a back of the seat A. Referring to FIGS. 4 and 7, an alternative embodiment of the support platform 10 is illustrated, in which a pair of actuation modules 14 are provided on the sub-frames 60 to form a frame 12", so as to support larger seats, such as seat A1 of FIG. 7.

The support platform of FIG. 7 has a pair of sub-frames 60, with each sub-frame 60 being provided with an actuation module 14. The sub-frames 60 are similar to the distal sub-frame 60 of FIGS. 2 and 5, whereby like elements will bear like reference numerals. The use of a pair of the actuation module 14 enables movements of the platform 10 along three degrees of freedom (e.g., pitch, roll and a translation along the Z axis).

The sub-frames 60 are interrelated by the tubular members 61 which enable expansion of the frame 12" along the X axis. The support plates 62 are displaceable along the Y axis such that the frame 12" is expandable/retractable in two translational degrees of freedom. The frame 12" is supported by the four output shafts of the two actuation modules 14.

In view of the embodiments illustrated in FIGS. 1 to 7, a method for installing a seating system (i.e., the actuated support platform 10 with the seats A, A1) is as follows. The actuated support frame 10 is positioned on the ground such that the actuators 40 of the actuation module(s) 14 can displace the frame 12/12'/12" with respect to the ground. The size of the frame 12/12'/12" is adjusted as a function of width and length dimensions of the seat A/A1 to be supported by the frame 12/12'/12", and the frame 12/12'/12" is locked in position (e.g., using fasteners 65 and 66). The seat A/A1 is then positioned on the frame 12/12'/12". Once the actuators 40 are connected to a selected video output, the actuated support frame 10 can be used to displace the seat A/A1 with respect to the ground.

The invention claimed is:

1. An actuated support frame and chair assembly for transmitting motion to a chair with respect to a ground as a function of motion signals associated with video output, comprising:
   an actuated support frame comprising:
      a frame, the frame being expandable/retractable along at least one translational degree of freedom, support surfaces at corners of the frame and lying concurrently in a support plane, the support surfaces being displaceable with respect to one another in the support plane by expansion/retraction of the frame so as to be sized to support a chair, and
      at least two actuators interconnected by the frame and being positioned between the frame and the ground, the actuators each being in an actuated casing secured directly to the frame with one of the actuated casing on each lateral side of the frame, and each actuator comprising an output shaft against the ground, the actuator being adapted to receive signals, to selectively displace the frame with respect to the ground in synchronization with a video output; and
   a chair for seating at least one person, the chair comprising a base with an undersurface facing the ground to define a bottom of the chair and with an upper surface for supporting a seated person, and a backrest projecting upwardly from a rear side of the chair, the chair being positioned on top of the frame on the support surfaces with corners of the chair superposed with the corners of the frame and with the undersurface of the base being above the support plane;
   whereby the chair and the frame move concurrently with respect to the ground in synchronization with the video output.

2. The assembly according to claim 1, wherein the frame is expandable/retractable along two translational degrees of freedom, so as to adjust to a width and a length of the chair received thereon.

3. The assembly according to claim 1, wherein structural members of the frame are in telescopic relation so as to provide the at least one degree of freedom.

4. The assembly according to claim 3, wherein the support surfaces on the frame are below an upper surface of the structural members defining a remainder of the frame.

5. The assembly according to claim 1, wherein a leg is provided on the frame, such that the frame is supported to the ground by the leg and the at least two actuators.

6. The assembly according to claim 5, wherein the leg is on a front end of the frame, and the at least two actuators are mounted to respective rear lateral ends of the frame.

7. The assembly according to claim 1, comprising four of the actuator, with a first and a second of the actuators being positioned adjacent to front corners of the frame, and with a third and a fourth of the actuators being positioned adjacent to rear corners of the frame.

8. The assembly according to claim 1, wherein pairs of the actuators on a same lateral side of the frame are enclosed in a single casing, with the casing being connected to the frame.

9. A method for installing a seating system of a motion simulator system, comprising:
   providing an actuated support frame having an expandable/retractable frame with actuators, with an actuated casing of each said actuator secured directly to the frame and an output shaft projecting downwardly from each said actuated casing;
   providing a chair comprising a base with an undersurface facing the ground and with an upper surface for supporting a seated person, and a backrest projecting upwardly from a rear side of the base;
   positioning the actuated support frame with the output shafts on the ground such that the actuators can displace the frame with respect to the ground;
   adjusting a size of the frame as a function of width and length dimensions of the base of the chair to be supported by the frame;
   positioning the undersurface of the base of the chair on top of the frame;
   connecting the actuators to a signal source in synchronization with a selected video output; and
   displacing concurrently the frame and the chair with respect to the ground by actuating the actuators in synchronization with the selected video output.

10. The method according to claim 9, wherein the step of adjusting the size of the frame includes locking the frame in a selected size.

* * * * *